US004001752B2

United States Statutory Invention Registration [19]

[11] Reg. Number: H1752

[45] Published: Oct. 6, 1998

Zampini et al.

[54] SINGLE DIGITAL SIGNAL PROCESSOR TO RECORD DIGITAL AUDIO DATA ON A MAGNETO OPTICAL DISK

[75] Inventors: Michael A. Zampini, Boca Raton; Sean Stevens, Pompano Beach; David C. Schmidt, Jupiter, all of Fla.

[73] Assignee: Sony Electronics, Inc., Park Ridge, N.J.

[21] Appl. No.: 676,913

[22] Filed: Jul. 8, 1996

Related U.S. Application Data

[63] Continuation of Ser. No. 480,945, Jun. 7, 1995, abandoned, which is a continuation of Ser. No. 151,875, Nov. 15, 1993, abandoned.

[51] Int. Cl.[6] ..... G11B 5/09

[52] U.S. Cl. ..... 369/48; 369/47

[58] Field of Search ..... 395/250, 800, 395/840, 841, 842, 872; 369/48, 14, 49, 59, 32, 47, 60

[56] References Cited

U.S. PATENT DOCUMENTS

| | | | |
|---|---|---|---|
| 4,858,217 | 8/1989 | Fujiie et al. . | |
| 5,129,036 | 7/1992 | Dean et al. . | |
| 5,303,218 | 4/1994 | Miyake . | |
| 5,337,295 | 8/1994 | Maeda . | |
| 5,343,451 | 8/1994 | Iizuka . | |
| 5,343,456 | 8/1994 | Maeda . | |
| 5,345,433 | 9/1994 | Ohga et al. . | |
| 5,359,626 | 10/1994 | Kloker et al. | 375/7 |
| 5,373,493 | 12/1994 | Iizuka | 369/124 |
| 5,388,093 | 2/1995 | Yoshida et al. | 369/124 |
| 5,400,315 | 3/1995 | Koishi et al. | 369/124 |
| 5,438,643 | 8/1995 | Akagiri et al. | 395/2.1 |
| 5,493,547 | 2/1996 | Zampini et al. . | |

OTHER PUBLICATIONS

Texas Instruments, *TMS320C3x Users Guide,* Jul. 1992, pp. 1–3 and 2–2.

*Primary Examiner*—Bernarr E. Gregory
*Attorney, Agent, or Firm*—Ronald P. Kananen

[57] ABSTRACT

Disclosed is a recorder/editor apparatus for recording and editing digital audio data. A single digital signal processor (DSP) is used to control processing of digital audio data which corresponds to up to eight simultaneous audio channels. A plurality of buffers and a direct memory access controller (DMA) are provided such that the digital audio data may be recorded and played back from a magneto optical (MO) disk drive via a SCSI.

10 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

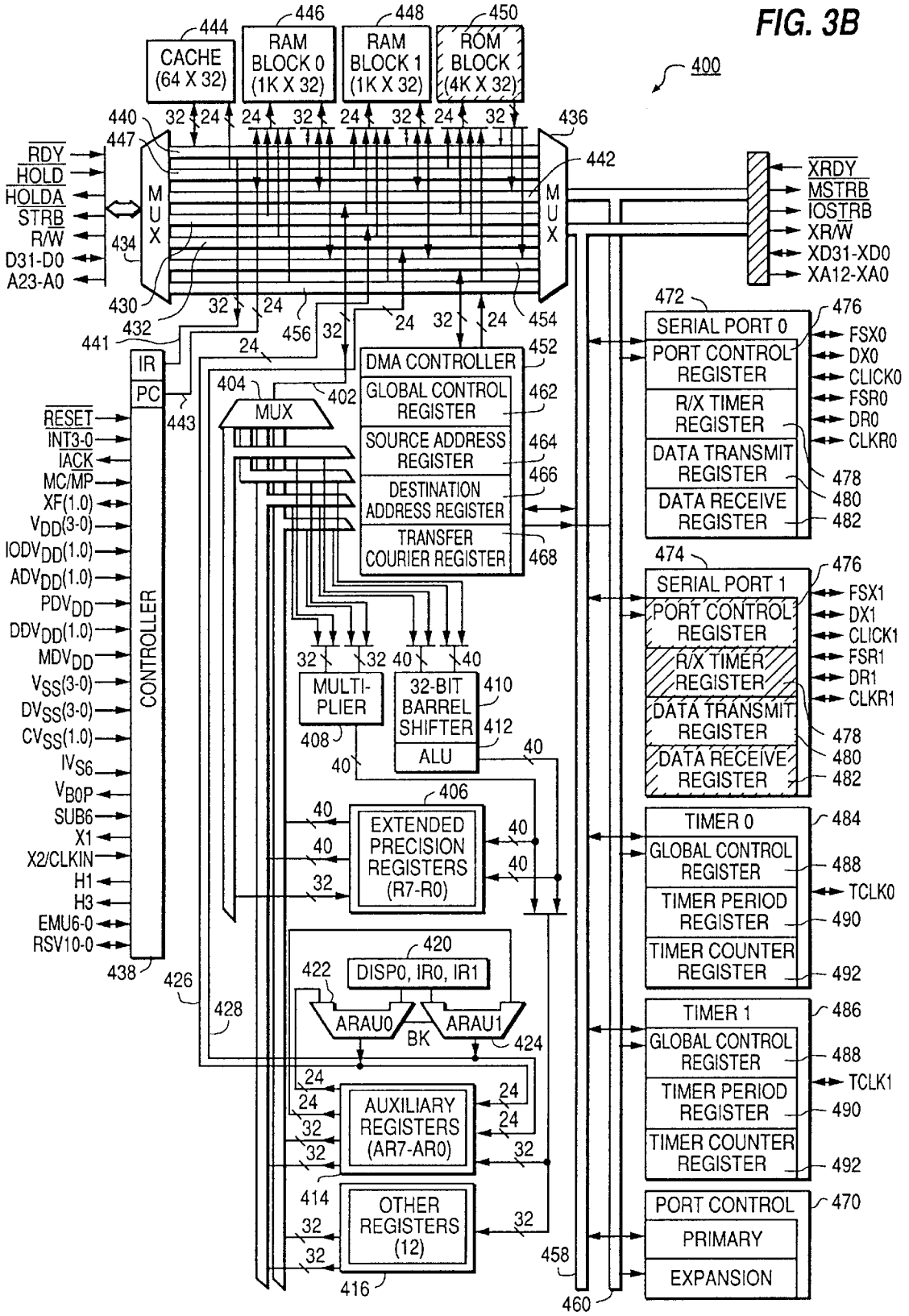
FIG. 3B
400
CACHE (64 X 32)
RAM BLOCK 0 (1K X 32)
RAM BLOCK 1 (1K X 32)
ROM BLOCK (4K X 32)
MUX
RDY
HOLD
HOLDA
STRB
R/W
D31-D0
A23-A0
XRDY
MSTRB
IOSTRB
XR/W
XD31-XD0
XA12-XA0
IR
PC
CONTROLLER
RESET
INT3-0
IACK
MC/MP
XF(1.0)
VDD(3-0)
IODVDD(1.0)
ADVDD(1.0)
PDVDD
DDVDD(1.0)
MDVDD
VSS(3-0)
DVSS(3-0)
CVSS(1.0)
IVS6
VBOP
SUB6
X1
X2/CLKIN
H1
H3
EMU6-0
RSV10-0
DMA CONTROLLER
GLOBAL CONTROL REGISTER
SOURCE ADDRESS REGISTER
DESTINATION ADDRESS REGISTER
TRANSFER COURIER REGISTER
MUX
MULTI-PLIER
32-BIT BARREL SHIFTER
ALU
EXTENDED PRECISION REGISTERS (R7-R0)
DISP0, IR0, IR1
ARAU0
ARAU1
BK
AUXILIARY REGISTERS (AR7-AR0)
OTHER REGISTERS (12)
SERIAL PORT 0
PORT CONTROL REGISTER
R/X TIMER REGISTER
DATA TRANSMIT REGISTER
DATA RECEIVE REGISTER
FSX0
DX0
CLICK0
FSR0
DR0
CLKR0
SERIAL PORT 1
FSX1
DX1
CLICK1
FSR1
DR1
CLKR1
TIMER 0
GLOBAL CONTROL REGISTER
TIMER PERIOD REGISTER
TIMER COUNTER REGISTER
TCLK0
TIMER 1
TCLK1
PORT CONTROL
PRIMARY
EXPANSION

SINGLE DIGITAL SIGNAL PROCESSOR TO RECORD DIGITAL AUDIO DATA ON A MAGNETO OPTICAL DISK

This application is a continuation of application Ser. No. 08/480,945 filed Jun. 7, 1995, which is a file wrapper continuation application of Ser. No. 08/151,875 filed Nov. 15, 1993, both now abandoned.

CROSS REFERENCE TO RELATED APPLICATIONS

Reference is made to the following commonly owned-co-pending application, "RECORDING EIGHT DIGITAL AUDIO CHANNELS ON A SINGLE MAGNETO OPTICAL DISK" (Attorney Docket No. SOA-032) filed on Sep. 30, 1993, Ser. No. 08/128,717, now U.S. Pat. No. 5,493,547.

FIELD OF THE INVENTION

This invention relates to the recording of digital audio data on a magneto optical disk (MO). More specifically, this invention relates to an improved method and apparatus utilizing a single digital signal processor (DSP) for recording digital audio data on a MO disk.

BACKGROUND OF THE INVENTION

In the audio recording field, there are various techniques used to record and edit digital audio data. In a typical application, audio data is provided by one or more multichannel audio players, such as video tape recorders (VTRs) to a mixer. The mixer may be used to edit the audio data and provide output audio signals to one or more recording devices, such as recorder VTRs.

Alternatively, it may at times be more convenient to utilize a single machine which can both edit and record digital audio data. However, prior art devices which combine these two functions are limited because of the difficulties in maintaining low cost, ease of use, and high quality in audio processing and recording. For example, in order to both record and perform relatively simple edits, prior art techniques utilize both a microprocessor and a DSP with a resulting increase in cost.

Moreover, because most digital audio recording applications involve a high data acquisition rate and a relatively low data recording rate, it has heretofor been difficult to provide digital audio recording which is convenient to use and provides a high quality recording. For example, digital audio tape (DAT) recording technology generally utilizes four channels of information which are simultaneously recorded on a tape medium. While providing an improvement in recording quality over previous technology, DAT still suffers from slow access time in playing back recorded data. Further, DAT recording results in difficulty in skipping tracks for editing or playback. Moreover, the use of only four channels limits sound quality.

Outside the audio recording field, magneto optical (MO) disks have been developed for the storage and playback of digital data. Magneto optical disks provide at least two advantages over storage systems using a tape storage medium. First, the information stored on the MO disk may be accessed much more rapidly than can information stored on a tape recording medium. Secondly, the MO disk provides the capability of "slipping" tracks in time.

However, wider use of MO recording has heretofore been limited because of the relatively slow transfer rate of data from the MO disk controller to the MO disk itself, and the relatively fast rate of data acquisition from the source to be recorded. The discrepancy in speed of these two functions have made it difficult to apply this technology to other fields, such as audio recording.

Hence, there is a need to provide a player/recorder device which provides a simpler processing configuration while providing greater ease of use and high quality recording.

SUMMARY OF THE INVENTION

A general object of this invention is to overcome these and other drawbacks of the prior art by providing a magneto optical disk player and recorder device which utilizes a single digital signal processor.

Accordingly, there is disclosed a digital audio player and recorder apparatus for recording, playing back and editing digital audio data comprising: a digital signal processor (DSP) having buffer means for storing digital audio data and processing means for processing digital audio data stored in the buffer means; and means for recording said digital audio data stored in said buffer means, where the recording means includes a magneto optical disk drive.

According to one aspect of the invention, the processing means include a multiplier and an arithmetic logic unit (ALU).

According to another aspect of the invention, the DSP further includes a plurality of buses for operatively coupling the buffer means with the multiplier and the ALU.

According to yet another aspect of the invention, the plurality of buses includes two data buses and two address buses.

According to another aspect of the invention, the DSP further includes a direct memory access (DMA) controller for providing digital audio data to the buffer means.

According to still another aspect of the invention, the DSP further includes a barrel shifter which receives digital audio data from the plurality of buses via two multiplexers and outputs the data to said ALU.

According to another aspect of the invention, the DSP further includes a plurality of extended precision registers which receive digital data in parallel from the multiplier and the ALU and provide output register digital data to a plurality of register data lines.

According to yet another aspect of the invention, the DSP further includes a plurality of address generators and a plurality of auxiliary register arithmetic units coupled to a plurality of auxiliary registers where the plurality of auxiliary registers each receive digital data from the plurality of auxiliary register arithmetic units, the multiplier and the ALU.

According to still another aspect of the invention, the recording means further includes a small computer system interface (SCSI) which operatively couples the MO disk drive with the DSP.

According to another aspect of the invention, the audio data corresponds to an audio signal having eight channels.

BRIEF DESCRIPTION OF THE DRAWINGS

FIG. 3B is a block diagram showing a detailed representation of a single digital signal processor according to an embodiment of the present invention.

DETAILED DESCRIPTION OF THE PREFERRED EMBODIMENT

Figure 1:
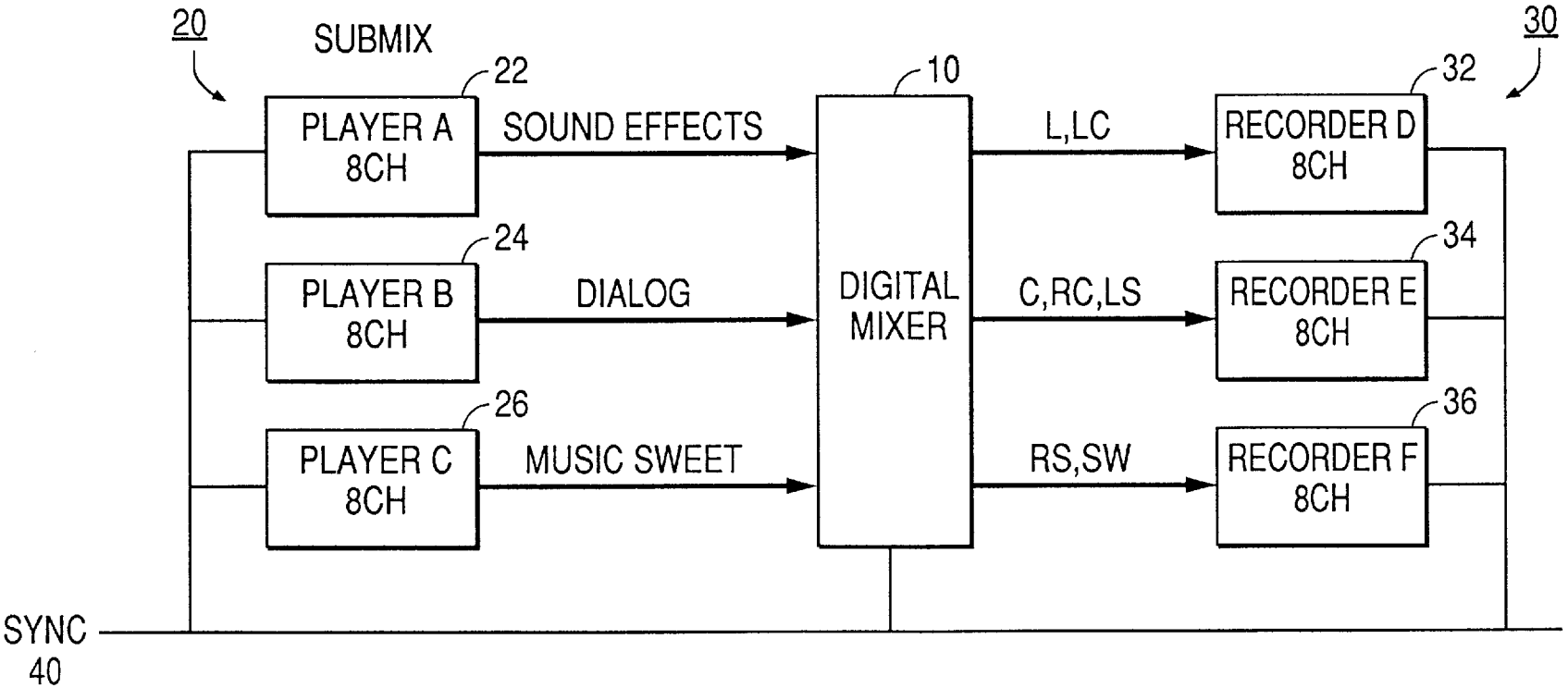
FIG. 1 is an example of an audio recording system utilizing the present invention.

FIG. 1 shows an audio recording system which may be used for professional recording, for example. In this system a digital mixer 10 is coupled to various multichannel input devices 20 and various multichannel output devices 30. Each device operatively shares a common SYNC signal 40. The input devices shown are a plurality of eight-channel player-recorders 20. A first player 22 is used to provide sound effects to the digital mixer, while other players 24 and 26 provide dialog and music sweet, respectively, to the mixer 10. Once input to the mixer 10, these signals are processed in various ways as known in the art and can be output to, for example, a plurality of multichannel recorders 32, 34, 36. In the system shown, each of the player/recorders is an eight channel device; that is, each device plays-back or records eight channels simultaneously.

Figure 2:
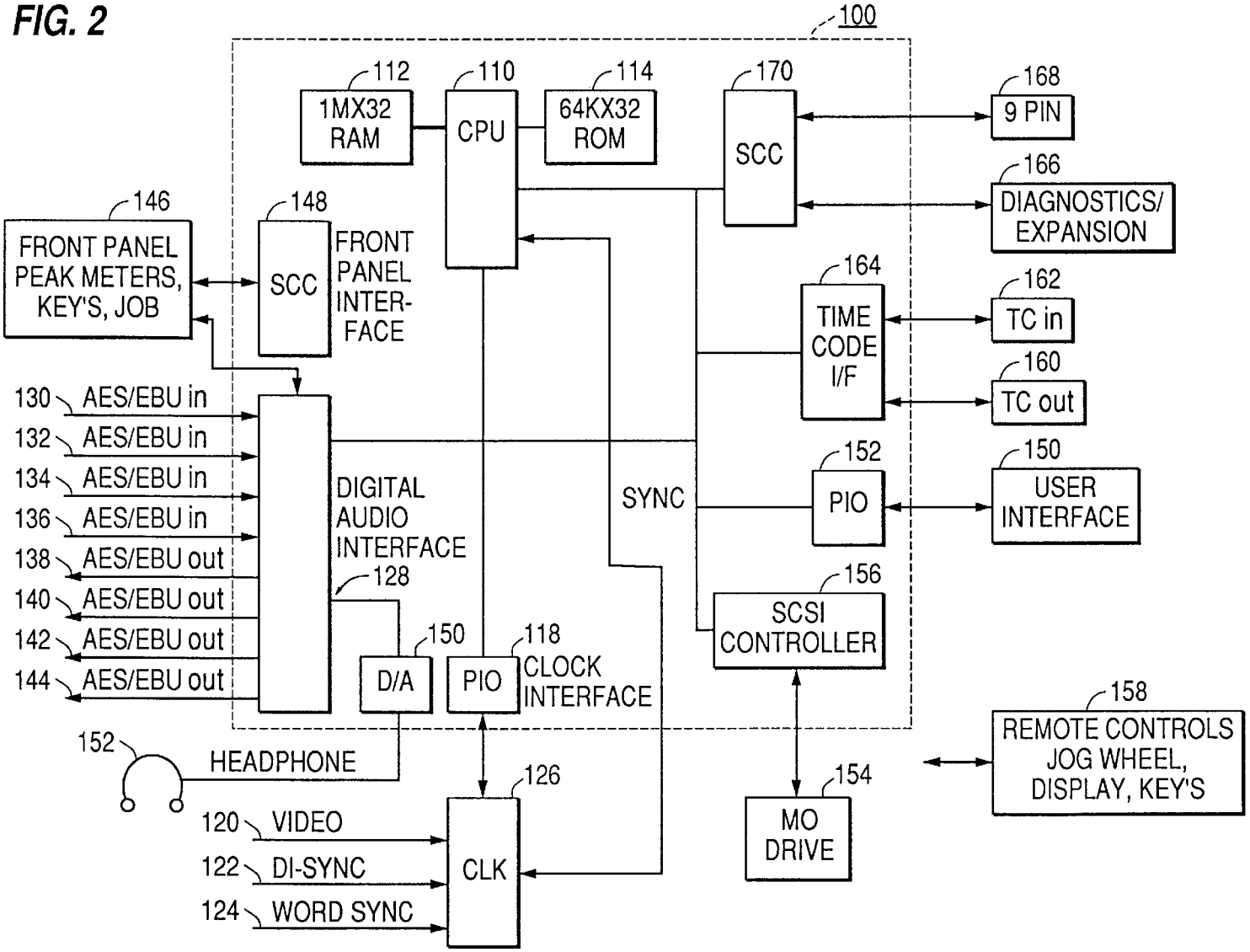
FIG. 2 is a block diagram showing a player recorder according to an embodiment of the present invention.

FIG. 2 is a block diagram of an eight channel player/recorder 100 according to one embodiment of the invention, such as may be used in the recording system previously described. In the device shown, various signals, both input and output, are controlled by a central processing unit (CPU) 110 which is associated with both volatile memory 112 and non-volatile memory 114. In the example shown, the CPU has associated with it random access memory (RAM) 112, as well as read only memory (ROM) 114.

The recorder is synchronized by means of SYNC signals provided to a CLK interface 118, for example a parallel input output (PIO) circuit. The SYNC signals may comprise, for example video 120, di-sync 122 and word sync 124 signals input to the recorder 100 via a clock circuit 126, as shown in FIG. 2. In this way, the recorder 100 may be synchronized with other devices which comprise a recording system, as in the example shown in FIG. 1.

The CPU 110 is used to control the flow of digital audio data input to, and output from, the recorder 100 via a digital audio interface 128. The digital audio data is input at four ports 130, 132, 134, and 136 to the digital audio interface 128. Each port receives the data in the AES/EBU format. Thus, each port provides two channels of serial audio data. Together, the four ports provide four separate lines for providing eight audio channels to the recorder device. Similarly, by using four audio OUT ports 138, 140, 142, and 144, eight channels of digital audio signals may be output from the recorder 100. Digital audio data may also be converted to analog signals using a D/A converter 150, and the analog signals output to an external monitoring device, such as a set of headphones 152.

The digital audio interface 128 may be controlled locally by a user via a front panel 146 of the recorder 100, which may include various peak meters, keys or jog wheels. These devices may provide a display of the status of the recorder. Moreover, input from these devices may be used to control the recorder via a serial communication controller 148 (SCC). Alternatively, the recorder may include means for remote control and display 158, including, for example a jog wheel, display, or keys. Further, the recorder 100 may be controlled using a user interface 150 linked to the recorder 100 via a parallel input output (PIO) circuit 152.

In a typical operation, eight channels of data are input from the four IN ports. This input provides four sets of data in parallel which may be conveniently processed by the CPU. Each set of data contains two channels of twenty four bit audio data for a total of eight channels. This data may be processed in the recorder 100 under control of the CPU 110.

More specifically, according to one embodiment of the invention, the eight channels of digital audio signals may be recorded onto, or played-back from a magneto optical disk drive 154 via a small computer system interface (SCSI) 156. In this example, the problems associated with a large data transfer rate and a relatively slow read/write rate are overcome by use of proper buffering and direct memory access (DMA) transfers. These features are explained with reference to FIG. 3A.

Figure 3A:
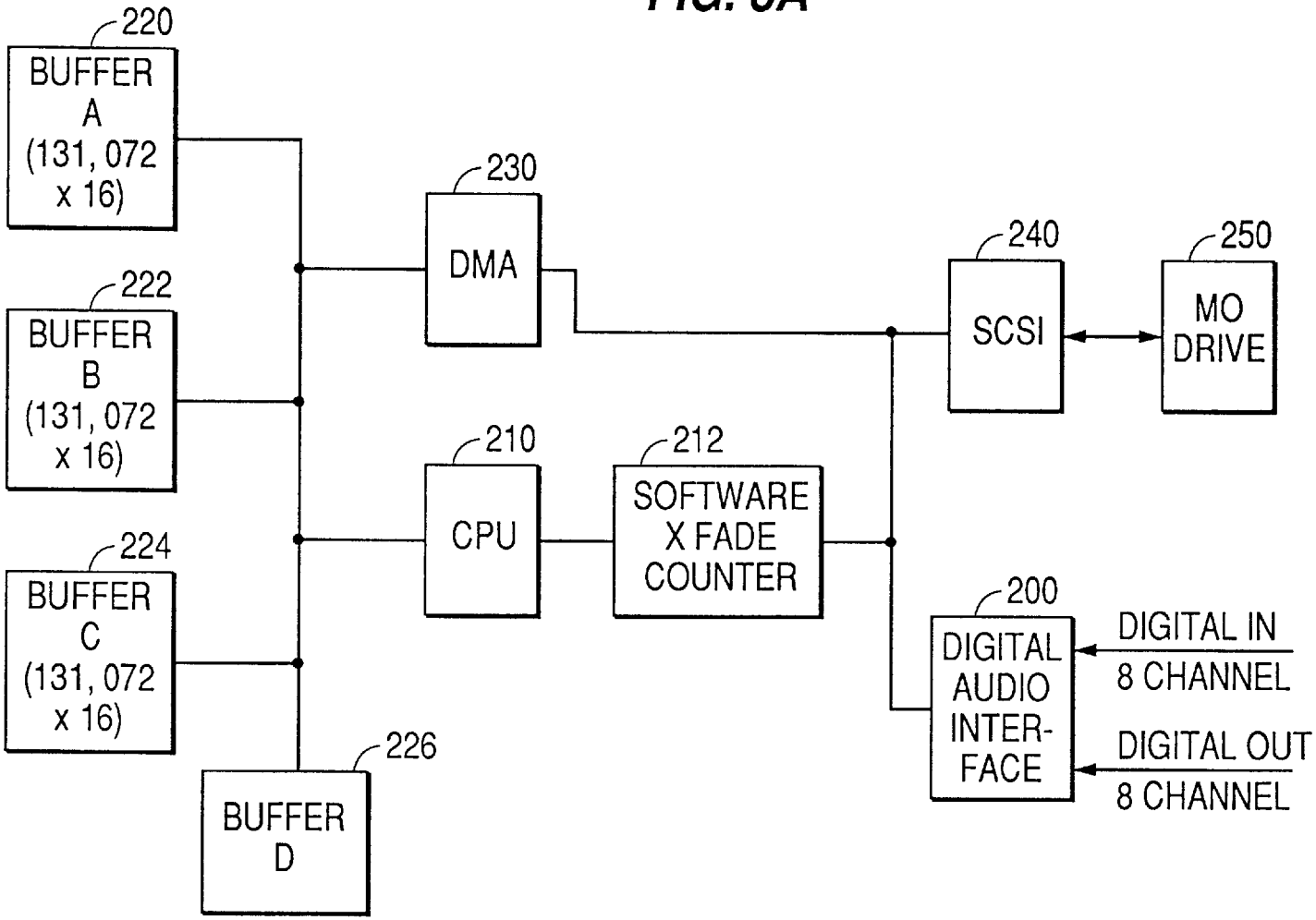
FIG. 3A is a block diagram further showing a player/recorder according to an embodiment of the present invention.

FIG. 3A is a block diagram illustrating an embodiment in which eight channels of digital audio signals are input to a digital audio interface 200. The digital audio interface 200 converts the serial data to parallel data which can be processed more conveniently by a CPU 210. Such processing may be performed, for example, under control of cross-fade control software 212. The conversion of the data may include error checking processing by means known in the art (not shown).

In order to overcome the difference in the transfer rate of the data and the slower read/write rate, various buffers 220, 222, 224, and 226 are provided. Accordingly, the parallel data is read into the buffers 220, 222, 224, and 226 via a DMA controller 230. After being received into a buffer, the data can be provided to the SCSI 240 at the correct speed, as required by the particular MO drive 250 which is used. For example, a typical SCSI controller and MO drive, may write 1.5 bytes every second, while each read/write interval in which an eight channels (eight words) are read or written requires 20.83 $\mu$sec. Thus, if two buffers holding 131,072 words (16 bytes) are used, the SCSI would require 174 msec to write the contents of two buffers holding eight audio channels. However, different buffer sizes may be used as required as different MO drives with various speeds are used.

The system shown in FIG. 3A may also be used in a similar manner for a playback operation. That is, as the MO drive 250 reads digital audio data from a MO disk, the data is provided to buffers 220, 222, 224, and 226 from which it can be transferred via the DMA controller 230 to the digital audio interface 200. The digital audio interface 200 converts the parallel data to serial data which may be output to other devices (not shown).

FIG. 3B is a block diagram providing a detailed representation of a single digital signal processor (DSP) 400 according to a preferred embodiment of the invention. The DSP shown may be incorporated in a single chip package which provides the same function as the DMA 230, the CPU 210 and the buffers 220, 222, 224 and 226 of FIG. 3A. As illustrated, a thirty-two bit data line 402 provides data words to a multiplexer 404 which is coupled to eight extended precision registers 406, a multiplier 408, and a thirty two bit barrel shifter 410. The barrel shifter 410 operates together with an arithmetic logic unit (ALU) 412 which, with the multiplier 408, provides input to the eight extended precision registers 406, eight auxiliary registers 414, and other registers 416. Arranged as shown, the ALU 412 and the multiplier 408 provide parallel forty bit floating point and thirty-two bit integer instructions in a single cycle.

The DSP 400 further includes two address generators 420 each coupled to the eight auxiliary registers 414 and to two auxiliary register arithmetic units 422 and 424. The auxiliary registers 414 and the other registers 416 together provide address data via two twenty-four bit address lines 426 and 428 to two address buses 430 and 432. These address buses 430 and 432 are further coupled to two multiplexers 434 and 436 which couple the DSP 400 with other circuitry (not shown) in such a manner that digital audio data may be provided in parallel form from an MO disc to other areas of the editor/recorder. The multiplexers 434 and 436 are coupled through an address bus 447 and the other buses described below.

Further shown in this embodiment, is a controller 438 which is coupled to a first data bus 440 and a second data bus 442 respectively through a thirty two bit data line 441 and a twenty-four bit address line 443. Through these bus lines 440 and 442, the controller 438 is coupled with various memory blocks 449, 446, 448 and 450 provided with the DSP 400. The controller 438 provides timing and control signal to the DSP along the dataline 441 and the address line 443.

As illustrated, the memory blocks include one 4K thirty-two bit single-cycle dual-access ROM block 450, two 1K thirty-two bit single-cycle dual-access on-chip RAM blocks 446 and 448, and a thirty-two bit instruction cache 444. These memory blocks substantially correspond in function with the buffers described in reference to FIG. 3A.

Also shown in FIG. 3B is a DMA controller 452 which is coupled with the memory blocks 444, 446, 448 and 450 through a data bus 454 and an address bus 456. The DMA is further coupled with various peripheral circuits through a peripheral data bus 458 and a peripheral address bus 460. The DMA controller utilized in this embodiment includes a global control register 462, a source address register 464, a destination address register 466, and a transfer counter register 468.

The peripheral circuits illustrated include a port control 470 and two serial ports 472 and 474 each of which includes a port control register 476, a R/X timer register 478, a data transmit register 480, and a data receive register 482. Further shown are two timers 484 and 486 each coupled to the other elements of the DSP 400 via the peripheral bus lines 458 and 460. Each of these timers 484 and 486 include a global control register 488, a timer period register 490, and a timer counter register 492.

The DSP 400 according to this embodiment is a single chip processor which may be utilized in a player/recorder device, such as that described above in reference to FIGS. 2 and 3A. The cache 444, the DMA controller 452 and the two sets of address and data buses each coupled to the multiplexers 434 and 436, as well as the other circuits shown in FIG. 3B, provide computational speed which allow the DSP 400 to process the large quantity of digital audio data that is transferred to and from a MO disk.

Figure 4:
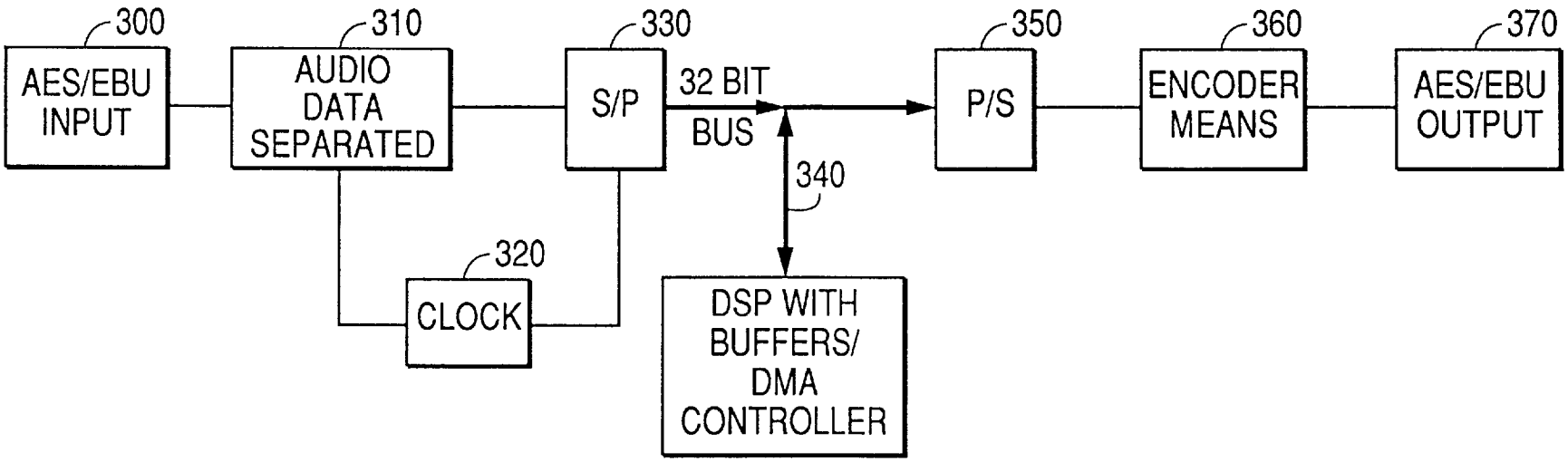
FIG. 4 is a block diagram showing a scheme for providing digital audio data to a player/recorder according to an embodiment of the present invention.

FIG. 4 is a block diagram illustrating an example in which eight channel serial audio data is input into a recorder and converted to parallel data for processing or recording, and processed data or data read from a MO disk is converted to serial data to be output to other devices using the AES/EBU format. In the block 300, serial data is input in the AES/EBU format. In the next stage 310 of the circuit, the audio data bits of this thirty-two bit format is separated from the other bits, such as sync bits and the audio sample validity bit, by a technique known in the art. According to this embodiment, the data bits representing the audio signal may comprise twenty-four bits of audio data, which are converted from a serial format to a parallel format by a serial to parallel converter circuit 330.

The control circuits for implementing the data separation 310 and S/P conversion 330 are operated according to control signals originating from a common clock circuit 320. The parallel data is then input along with associated address bits onto bus lines 340 which are operatively coupled to a DSP 345 having a DMA controller and buffer circuits. In a preferred embodiment these elements are incorporated into a single chip, such as described with reference to FIG. 3B.

Parallel audio data, for example from various buffers, may be sent to a parallel to serial conversion circuit 350 and then encoded into AES/EBU format by encoding circuits 360. The encoded data may then be provided to other output devices via a serial output 370.

According to the preferred embodiment, a single digital signal processor may perform the data processing necessary for both editing and recording of eight tracks of digital audio data. Thus, recorder/editor devices incorporating the invention may be used to more conveniently edit various audio signals by utilizing the ease of access provided by a MO disk. The invention is thus well suited to incorporation in audio production and video post-production facilities. Its many applications in film television, radio and audio recording production include library storage and retrieval, composition of commercials by an assembly process, recording for acquisition of program material for use in an audio work station, and playback of work station generated program material.

The foregoing is a detailed description of the preferred embodiments. The scope of the invention, however, is not so limited. Various alternatives will be readily apparent to one of ordinary skill in the art. The invention is only limited by the claims appended hereto.

What is claimed is:

1. A digital audio recording and editing apparatus comprising:

a plurality of digital audio input channels each supplying audio data;

a signal processing circuit which processes said audio data; and a memory device for storing said processed audio data;

wherein, said signal processing circuit comprises:

a first multiplexer for receiving said audio data;

a second multiplexer connected to said first multiplexer by a plurality of address buses and a plurality of data buses;

buffer memory connected to said address and data buses between said first and second multiplexers; and a direct memory access controller coupled to said buffer memory through said buses at a point between said first and second multiplexers.

2. The apparatus according to claim 1, wherein said signal processing circuit further comprises a multiplier and an arithmetic logic unit.

3. The apparatus according to claim 2 wherein said signal processing circuit further includes a barrel shifter, said barrel shifter receiving digital audio data from said plurality of buses via a third multiplexer and outputting said data to said arithmetic logic unit.

4. The apparatus according to claim 3 wherein said signal processing circuit further includes a plurality of extended precision registers which receive digital data in parallel from said multiplier and said arithmetic logic unit and provide output register digital data to a plurality of register data lines.

5. The apparatus according to claim 4 wherein said signal processing circuit further includes a plurality of address generators and a plurality of auxiliary register arithmetic units coupled to a plurality of auxiliary registers, said plurality of auxiliary registers each receiving digital data from said plurality of auxiliary register arithmetic units, from said multiplier and from said arithmetic logic unit.

6. The apparatus according to claim 3, wherein said audio data supplied to said third multiplexer is supplied over a 32-bit data line.

7. The apparatus according to claim 1 wherein said pluralities of buses include three data buses and four address buses.

8. The apparatus according to claim 1, wherein said memory device is a magneto-optical disc.

9. The apparatus according to claim 8, further comprising a small computer systems interface connecting said second multiplexer to said magneto-optical disc.

10. The apparatus according to claim 1, wherein said direct memory access controller further comprises a global control register, a source address register, a destination address register, and a transfer courier register.

* * * * *